US011942257B2

(12) United States Patent
Kim et al.

(10) Patent No.: US 11,942,257 B2
(45) Date of Patent: Mar. 26, 2024

(54) COIL ELECTRONIC COMPONENT

(71) Applicant: SAMSUNG ELECTRO-MECHANICS CO., LTD., Suwon-si (KR)

(72) Inventors: Jae Hun Kim, Suwon-si (KR); Byeong Cheol Moon, Suwon-si (KR); Boum Seock Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 465 days.

(21) Appl. No.: 17/138,001

(22) Filed: Dec. 30, 2020

(65) Prior Publication Data

US 2021/0118605 A1 Apr. 22, 2021

Related U.S. Application Data

(62) Division of application No. 15/974,094, filed on May 8, 2018, now abandoned.

(30) Foreign Application Priority Data

Sep. 15, 2017 (KR) ........................ 10-2017-0118703

(51) Int. Cl.
*H01F 27/28* (2006.01)
*H01F 17/00* (2006.01)
(Continued)

(52) U.S. Cl.
CPC ..... *H01F 27/2804* (2013.01); *H01F 17/0013* (2013.01); *H01F 27/29* (2013.01);
(Continued)

(58) Field of Classification Search
CPC ......... H01F 27/2804; H01F 2027/2809; H01F 27/324; H01F 27/29; H01F 17/0013
(Continued)

(56) References Cited

U.S. PATENT DOCUMENTS 5,396,212 A 3/1995 Hernandez et al.
6,333,830 B2 12/2001 Rose et al.
(Continued)

FOREIGN PATENT DOCUMENTS

CN 104733154 A 6/2015
CN 106205953 A 12/2016
(Continued)

OTHER PUBLICATIONS

Office Action issued in corresponding Chinese Patent Application No. 201811055572.4 dated Sep. 23, 2020, with English translation.
(Continued)

*Primary Examiner* — Bickey Dhakal
*Assistant Examiner* — Joselito S. Baisa
(74) *Attorney, Agent, or Firm* — MORGAN, LEWIS & BOCKIUS LLP

(57) ABSTRACT

The coil electronic component includes: a body including a support member having a through-hole, an internal coil disposed on one or more of upper and lower surfaces of the support member, and an encapsulant encapsulating the support member and the internal coil; and external electrodes disposed on an external surface of the body and connected to the internal coil. The internal coil has coil patterns including an innermost and an outermost coil patterns. A portion of cross section of the innermost coil pattern has a different width than a remainder of the cross section of the innermost coil pattern.

18 Claims, 4 Drawing Sheets

IV-IV'

(51) Int. Cl.
*H01F 27/29* (2006.01)
*H01F 27/32* (2006.01)
*H01F 17/04* (2006.01)

(52) U.S. Cl.
CPC ......... *H01F 27/292* (2013.01); *H01F 27/324* (2013.01); *H01F 2017/048* (2013.01); *H01F 2027/2809* (2013.01)

(58) Field of Classification Search
USPC .......................................................... 336/192
See application file for complete search history.

(56) References Cited

U.S. PATENT DOCUMENTS

| | | | | |
|---|---|---|---|---|
| 6,831,543 | B2 * | 12/2004 | Mizoguchi | H01F 17/0006 336/200 |
| 7,307,503 | B2 | 12/2007 | Kaji et al. | |
| 7,498,919 | B2 | 3/2009 | Fujiwara et al. | |
| 8,133,764 | B2 | 3/2012 | Dirks et al. | |
| 8,243,406 | B2 | 8/2012 | Asakura et al. | |
| 8,325,003 | B2 | 12/2012 | Wu | |
| 8,514,539 | B2 | 8/2013 | Asakawa et al. | |
| 9,437,363 | B2 | 9/2016 | Choi et al. | |
| 9,899,141 | B2 | 2/2018 | Lee et al. | |
| 10,123,420 | B2 * | 11/2018 | Lee | H01F 27/292 |
| 10,192,672 | B2 | 1/2019 | Yang et al. | |
| 10,217,563 | B2 | 2/2019 | Wang et al. | |
| 10,431,368 | B2 | 10/2019 | Choi et al. | |
| 10,504,644 | B2 | 12/2019 | Lee et al. | |
| 10,541,076 | B2 | 1/2020 | Park et al. | |
| 11,031,174 | B2 * | 6/2021 | Kim | H01F 17/0013 |
| 11,043,324 | B2 | 6/2021 | Kao | |
| 2004/0166370 | A1 | 8/2004 | Mizoguchi et al. | |
| 2004/0240106 | A1 * | 12/2004 | Iitsuka | G11B 5/3906 360/123.41 |
| 2005/0184848 | A1 | 8/2005 | Yoshida et al. | |
| 2006/0001520 | A1 | 1/2006 | Kaji et al. | |
| 2007/0222550 | A1 * | 9/2007 | Fujiwara | H01F 17/0033 336/200 |
| 2009/0322458 | A1 | 12/2009 | Lee et al. | |
| 2010/0025840 | A1 | 2/2010 | Dirks et al. | |
| 2011/0140564 | A1 | 6/2011 | Nomura et al. | |
| 2013/0300529 | A1 | 11/2013 | Chang et al. | |
| 2014/0292468 | A1 | 10/2014 | Motomiya et al. | |
| 2015/0028983 | A1 | 1/2015 | Ryu et al. | |
| 2015/0035634 | A1 | 2/2015 | Nakamura et al. | |
| 2015/0035640 | A1 | 2/2015 | Wang et al. | |
| 2015/0123757 | A1 | 5/2015 | Choi | |
| 2015/0155093 | A1 | 6/2015 | Kim et al. | |
| 2015/0170823 | A1 | 6/2015 | Jeong et al. | |
| 2015/0255206 | A1 | 9/2015 | Han et al. | |
| 2015/0340149 | A1 | 11/2015 | Lee et al. | |
| 2016/0293320 | A1 | 10/2016 | Kim et al. | |
| 2016/0351320 | A1 | 12/2016 | Jeong | |
| 2017/0032884 | A1 | 2/2017 | Choi et al. | |
| 2017/0040101 | A1 | 2/2017 | Jeong | |
| 2017/0047160 | A1 | 2/2017 | Kim et al. | |
| 2017/0062121 | A1 | 3/2017 | Yang et al. | |
| 2018/0114619 | A1 * | 4/2018 | Kim | H01F 10/06 |
| 2019/0013145 | A1 * | 1/2019 | Ohkubo | H01F 17/04 |
| 2019/0115142 | A1 * | 4/2019 | Kim | H01F 41/046 |
| 2019/0259522 | A1 * | 8/2019 | Kim | H01F 27/24 |
| 2019/0371513 | A1 * | 12/2019 | Kim | H01F 27/2804 |
| 2020/0154834 | A1 * | 5/2020 | Choi | F16G 11/10 |

FOREIGN PATENT DOCUMENTS

| | | | | | |
|---|---|---|---|---|---|
| CN | 111161945 | A | * | 5/2020 | H01F 17/0006 |
| JP | 11-204337 | A | | 7/1999 | |
| JP | 4012526 | B2 | | 11/2007 | |
| KR | 10-1999-0066108 | A | | 8/1999 | |
| KR | 10-1525703 | B1 | | 6/2015 | |
| KR | 10-2015-0134014 | A | | 12/2015 | |
| KR | 10-2015-0134858 | A | | 12/2015 | |
| KR | 10-2016-0139967 | A | | 12/2016 | |
| KR | 10-2017-0017480 | A | | 2/2017 | |
| KR | 102029586 | B1 | * | 10/2019 | |
| TW | 201001457 | A | | 1/2010 | |

OTHER PUBLICATIONS

Office Action issued in corresponding Korean Patent Application No. 10-2017-0118703 dated Sep. 13, 2018, with English translation.
Final Office Action issued in corresponding U.S. Appl. No. 15/974,094 dated Jun. 1, 2021.
Final Office Action issued in corresponding U.S. Appl. No. 15/974,094 dated Feb. 7, 2022.
Non-Final Office Action issued in corresponding U.S. Appl. No. 15/974,094 dated May 24, 2022.
Office Action issued in corresponding U.S. Appl. No. 15/974,094 dated Oct. 4, 2021.
Office Action issued in corresponding U.S. Appl. No. 15/974,094 dated Nov. 9, 2022.

* cited by examiner

III-III'

COIL ELECTRONIC COMPONENT

CROSS-REFERENCE TO RELATED APPLICATION(S)

This application is a divisional application of U.S. patent application Ser. No. 15/974,094 filed on May 8, 2018, which claims the benefit of priority to Korean Patent Application No. 10-2017-0118703 filed on Sep. 15, 2017, in the Korean Intellectual Property Office, the disclosures of which are incorporated herein by reference in their entirety.

TECHNICAL FIELD

The present disclosure relates to a coil electronic component, and more particularly, to a power inductor.

BACKGROUND

In accordance with the development of information technology (IT), apparatuses have been rapidly miniaturized and thinned. Therefore, market demand for small, thin devices has increased.

Korean Patent Laid-Open Publication No. 10-1999-0066108 provides a power inductor including a substrate having a via hole and coils disposed on opposite surfaces of the substrate and electrically connected to each other through the via hole in the substrate in line with current technical trends, thereby making an effect to provide an inductor including coils having uniform and high aspect ratios.

Further, in a design of a power inductor, generally, an area of a core region in a coil is narrow. Since magnetic flux is concentrated on the core region in the core, as described above, there is a need to optimize a flow of the magnetic flux through technical improvements of a structure of the region on which the magnetic flux is concentrated, as described above.

SUMMARY

An aspect of the present disclosure may provide a coil electronic component in which a flow of a magnetic flux is optimized and thus magnetic resistance is decreased.

According to an aspect of the present disclosure, a coil electronic component may include: a body including a support member having a through-hole, an internal coil disposed on one or more of upper and lower surfaces of the support member, and an encapsulant simultaneously encapsulating the support member and the internal coil; and external electrodes disposed on an external surface of the body and connected to the internal coil. The internal coil may include a plurality of coil patterns wound in one direction and connected to each other, and among the plurality of coil patterns, an innermost coil pattern may have a cross section composed of lower and lower cross sections, wherein the lower cross section is a rectangle and the upper cross section is a polygon at least partially including an inclined surface.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
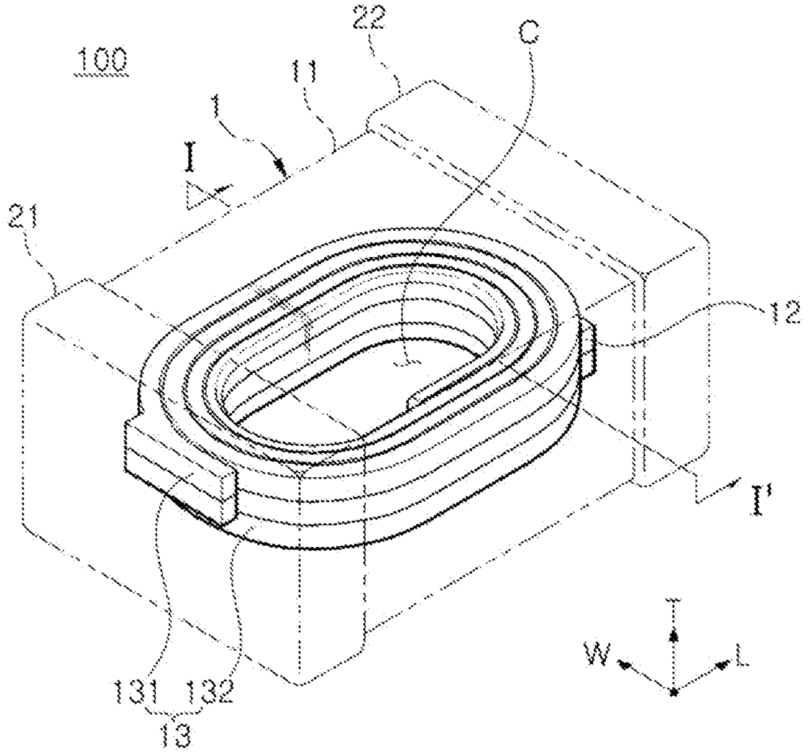
FIG. 1 is a schematic perspective view of a coil electronic component according to a first exemplary embodiment in the present disclosure.

Hereinafter, exemplary embodiments of the present disclosure will now be described in detail with reference to the accompanying drawings. In the accompanying drawings, shapes, sizes, and the like, of components may be exaggerated or stylized for clarity.

The present disclosure may, however, be exemplified in many different forms and should not be construed as being limited to the specific embodiments set forth herein. Rather these embodiments are provided so that this disclosure will be thorough and complete, and will fully convey the scope of the disclosure to those skilled in the art.

The term "an exemplary embodiment" used herein does not refer to the same exemplary embodiment, and is provided to emphasize a particular feature or characteristic different from that of another exemplary embodiment. However, exemplary embodiments provided herein are considered to be able to be implemented by being combined in whole or in part one with another. For example, one element described in a particular exemplary embodiment, even if it is not described in another exemplary embodiment, may be understood as a description related to another exemplary embodiment, unless an opposite or contradictory description is provided therein.

The meaning of a "connection" of a component to another component in the description includes an indirect connection through a third component as well as a direct connection between two components. In addition, "electrically connected" means the concept including a physical connection and a physical disconnection. It can be understood that when an element is referred to with "first" and "second", the element is not limited thereby. They may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

Herein, an upper portion, a lower portion, an upper side, a lower side, an upper surface, a lower surface, and the like, are decided in the accompanying drawings. For example, a first connection member is disposed on a level above a redistribution layer. However, the claims are not limited thereto. In addition, a vertical direction refers to the above-mentioned upward and downward directions, and a horizontal direction refers to a direction perpendicular to the above-mentioned upward and downward directions. In this case, a vertical cross section refers to a case taken along a plane in the vertical direction, and an example thereof may be a cross-sectional view illustrated in the drawings. In addition, a horizontal cross section refers to a case taken along a plane in the horizontal direction, and an example thereof may be a plan view illustrated in the drawings.

Terms used herein are used only in order to describe an exemplary embodiment rather than limiting the present disclosure. In this case, singular forms include plural forms unless interpreted otherwise in context.

Hereinafter, a coil electronic component according to an exemplary embodiment in the present disclosure will be described, but is not necessarily limited thereto.

Coil Electronic Component

Figure 2:
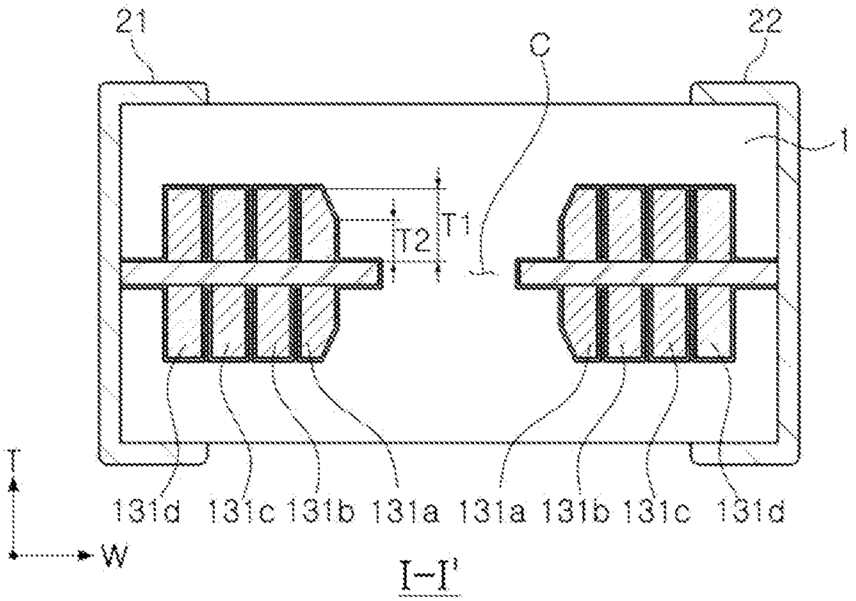
FIG. 2 is a schematic cross-sectional view taken along line I-I' of FIG. 1.

FIG. 1 is a schematic perspective view of a coil electronic component according to a first exemplary embodiment in the present disclosure, and FIG. 2 is a schematic cross-sectional view taken along line I-I' of FIG. 1.

Referring to FIGS. 1 and 2, a coil electronic component 100 according to the first exemplary embodiment may include a body 1 and first and second external electrodes 21 and 22 disposed on an external surface of the body.

The first and second external electrodes 21 and 22 may be formed on first and second end surfaces of the body opposing each other in a length direction to face each other and be selectively extended to at least portions of upper and lower surfaces, and the like, of the body. The first and second external electrodes may contain a conductive material and be composed of a plurality of layers while including Cu pre-plating layers or Ag-epoxy composite layers.

The body 1 may form an exterior of the coil electronic component, have upper and lower surfaces opposing each other in a thickness (T) direction, first and second end surfaces opposing each other in a length (L) direction, and first and second side surfaces opposing each other in a width (W) direction, and be substantially hexahedron. However, an external shape of the body is not limited.

The body 1 may include an encapsulant 11 formed of a magnetic material having magnetic properties. Here, as the magnetic material, any material may be used as long as it has the magnetic properties. For example, the magnetic material may be ferrite or a material in which metal magnetic particles are dispersed in a resin, wherein the metal magnetic particle may contain one or more selected from the group consisting of iron (Fe), silicon (Si), chromium (Cr), aluminum (Al), and nickel (Ni).

Further, a support member 12 and an internal coil 13 which are encapsulated by the encapsulant in addition to the encapsulant may be further included in the body 1.

The support member 12, which is to more thinly and easily form a coil, may be formed of a material having insulating properties and have a thin plate shape. For example, as the support member, a thermosetting resin such as an epoxy resin, a thermoplastic resin such as polyimide, resins in which a reinforcement material such as a glass fiber or an inorganic filler is impregnated in the thermosetting resin and the thermoplastic resin, for example, a prepreg, an ajinomoto build-up film (ABF), FR-4, a bismaleimide triazine (BT) resin, a photo imageable dielectric (PID) resin, or the like, may be used. When the glass fiber is contained in the support member, rigidity may be more excellent.

A through-hole may be formed in a central portion of the support member 12, and be filled with the magnetic material of the encapsulant, thereby forming a core central portion of the internal coil.

Further, the support member 12 may further include a via hole for a via V electrically connecting upper and lower coils 131 and 132 to be described below to each other, wherein the via hole may be composed of a plurality of via holes in order to prevent via open.

The internal coil 13 may be supported by the support member 12 and include the upper coil 131 supported by an upper surface of the support member 12 and the lower coil 132 supported by a lower surface of the support member 12. Since the upper and lower coils are substantially symmetrical to each other in relation to the support member 12, for convenience of explanation, a description thereof will be provided based on the upper coil 131, and a separate description of the lower coil will be omitted.

The upper coil 131 may include a plurality of coil patterns 131*a* to 131*d* wound in one direction to thereby be implemented in a spiral shape. A coil pattern closest to a core central portion C of the internal coil may be an innermost coil pattern 131*a*, and a coil pattern farthest from the core central portion of the internal coil and directly connected to a lead portion may be an outermost coil pattern 131*d*. Meanwhile, since each of the coil patterns is distinguished based on 1 turn in a winding direction of the internal coil, for example, the innermost coil pattern may be wound by 1 turn in the winding direction from one end portion thereof connected to the via to the other end portion thereof spaced apart from one end portion in the length direction by a predetermined interval. Continuously, another coil pattern may start to be wound from the other end portion of the innermost coil pattern.

Referring to FIGS. 1 and 2, a minimum thickness T2 of the innermost coil pattern 131*a* may be thinner than a minimum thickness T1 of the coil pattern 131*b* closest to the innermost coil pattern 131*a*. This is to allow the thickness of the innermost coil pattern closest to the core central portion of the internal coil in which a flow of magnetic flux is not smooth due to a relatively narrow area to be thin. Further, a portion of an upper surface of the innermost coil pattern may be formed to be inclined, and at the other portions thereof, the innermost coil pattern may be formed to have the same thickness as that of the other coil patterns, such that a magnetic flux density may be improved without a significant influence on an entire Rdc value, thereby improving inductance and DC-bias characteristics.

Further, a first insulator 14 may be disposed on a surface of each of the coil patterns, thereby maintaining insulation between adjacent coil patterns and between the coil patterns and the encapsulant.

A method of forming the first insulator 14 is not particularly limited.

As an example of the first insulator 14, a uniform insulating film may be formed on the surface of the coil pattern in a shape corresponding to the surface of the coil pattern using a chemical vapor deposition method, but the first insulator 14 is not limited thereto.

As long as an insulation defect does not occur, the thinner the film thickness of the first insulator, the more advantages in view of securing a space to be filled with the magnetic material. However, in consideration of the insulation defect it is preferable to maintain a film thickness of 1 μm or more to 10 μm or less. When the film thickness of the first insulator is less than 1 μm, insulation reliability may not be secured, and when the film thickness of the first insulator is more than 10 μm, a space to be filled with the magnetic material may be insufficient based on a size of a miniaturized coil electronic component. Further, an insulating material of the first insulator is not particularly limited, but may be suitably selected by those skilled in the art depending on a manufacturing process and desired specifications as long as it has insulating properties.

Figure 3:
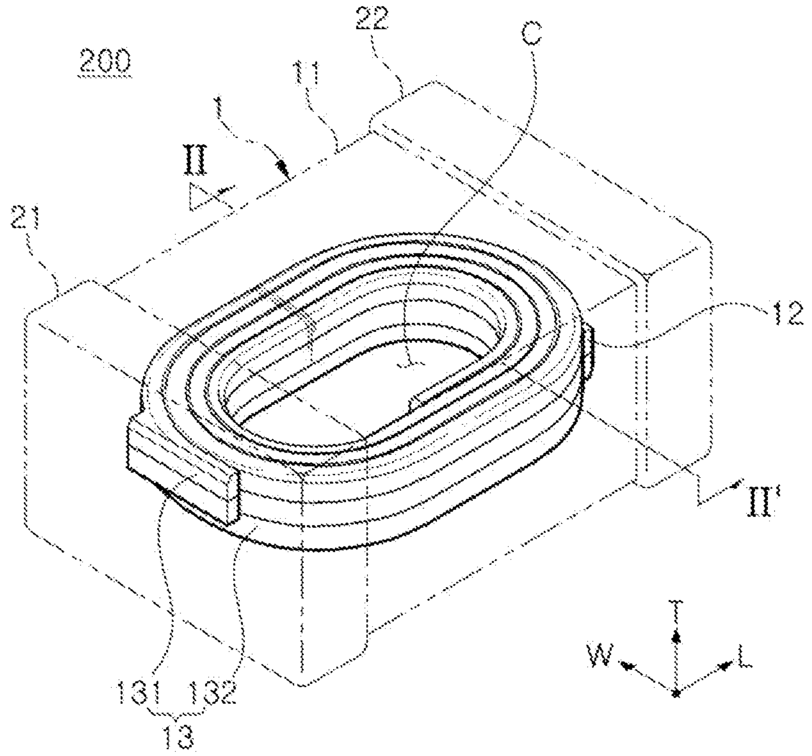
FIG. 3 is a schematic perspective view of a coil electronic component according to a second exemplary embodiment in the present disclosure.
Figure 4:
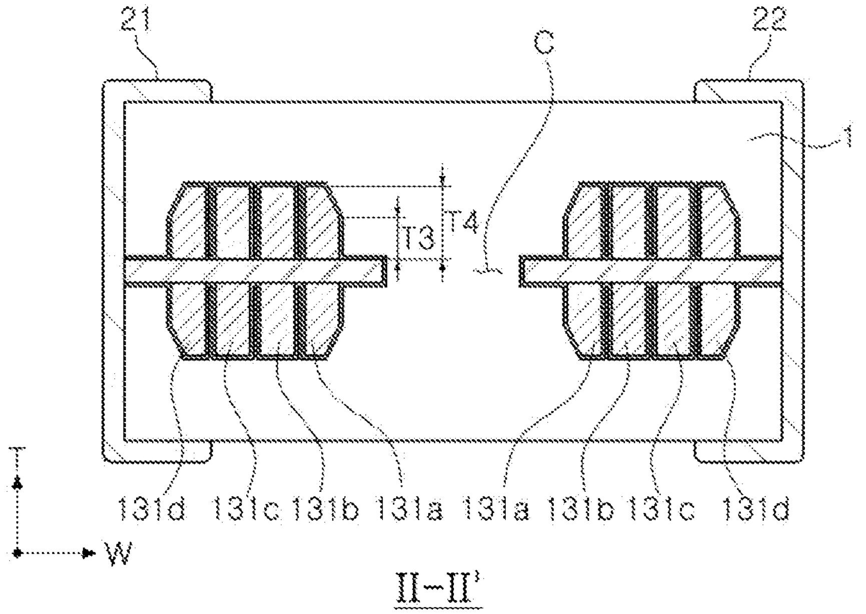
FIG. 4 is a schematic cross-sectional view taken along line II-II' of FIG. 3.

Next, FIGS. 3 and 4 illustrate a coil electronic component 200 according to a second exemplary embodiment in the present disclosure, wherein FIG. 3 is a schematic perspective view of the coil electronic component 200, and FIG. 4 is a schematic cross-sectional view taken along line II-II' of FIG. 3.

The coil electronic component 200 according to the second exemplary embodiment may be substantially the same as the coil electronic component 100 according to the first exemplary embodiment except for a cross-sectional shape of an outermost coil pattern. Therefore, for convenience of explanation, only the outermost coil pattern will be described below, a description of the other configurations will be omitted, and configurations overlapping those described above will be denoted by the same reference numerals.

Referring to FIGS. 3 and 4, a minimum thickness T3 of an outermost coil pattern 131*d* of upper and lower coils of the coil electronic component 200 may be thinner than a minimum thickness T4 of a coil pattern 131*c* adjacent thereto. Further, a portion of an upper surface of the outermost coil pattern of an internal coil rather than the entire upper surface of the outermost coil pattern may be formed to be inclined. This is to change the coil pattern so as to correspond to a shape of a flow of a magnetic flux because the magnetic flux formed from the internal coil flows downwardly toward a support member in the vicinity of the outermost coil pattern. As a result, the flow of the magnetic flux may be optimized, a magnetic flux density may be decreased, and inductance may also be increased. An inclination angle of an inclined surface or a length of the inclined surface extended in the length direction is not particularly limited. However, it is not preferable that the entire upper surface of the outermost coil pattern is formed to be inclined and an entire cross-sectional shape of an upper region of the outermost coil pattern is substantially triangular. In this case, Rdc of the coil electronic component may be unnecessarily increased, and breakdown voltage (BDV) characteristics may be deteriorated.

Figure 5:
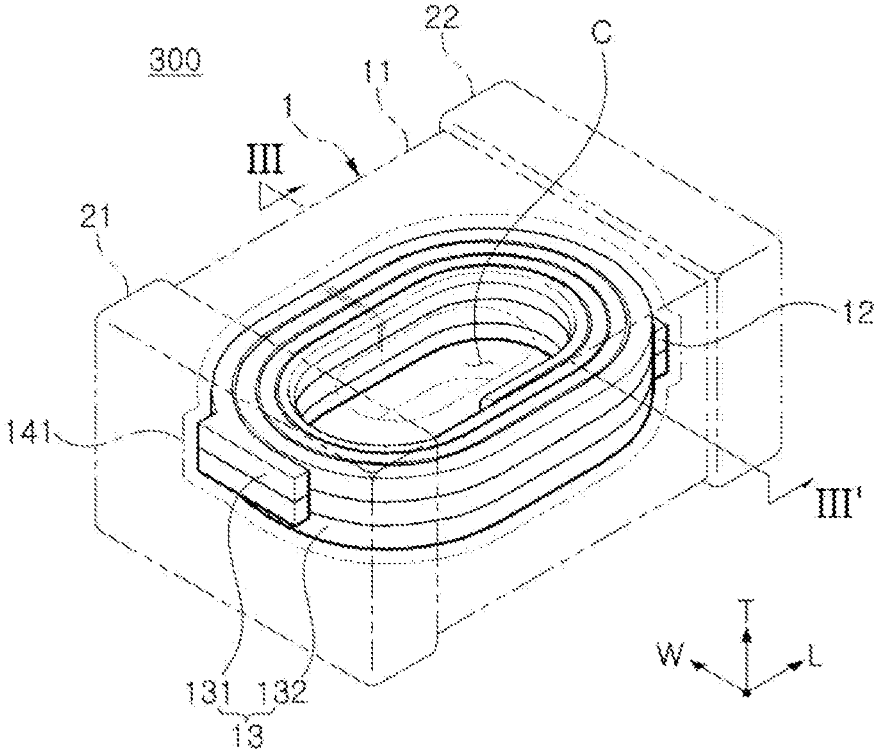
FIG. 5 is a schematic perspective view of a coil electronic component according to a third exemplary embodiment in the present disclosure.
Figure 6:
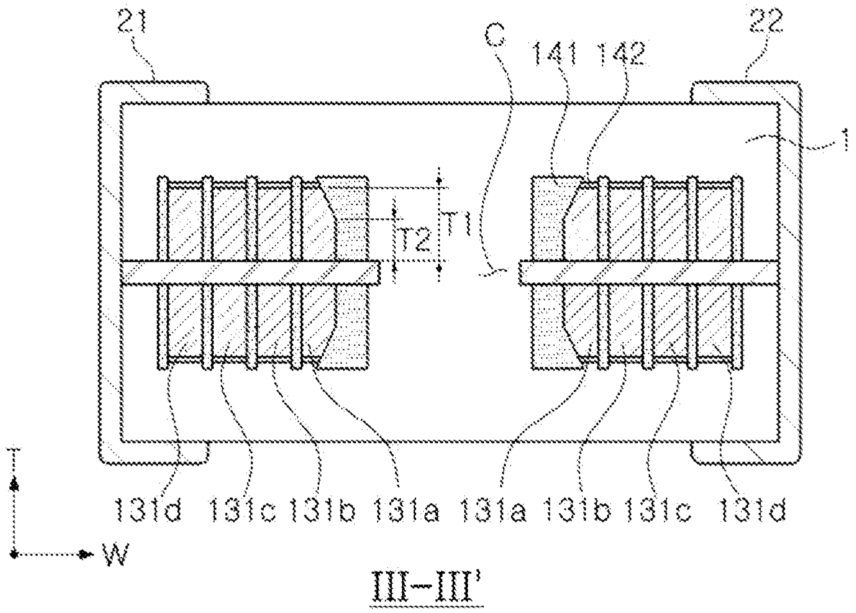
FIG. 6 is a schematic cross-sectional view taken along line of FIG. 5.

FIG. 5 is a schematic perspective view of a coil electronic component 300 according to a third exemplary embodiment in the present disclosure, and FIG. 6 is a cross-sectional view taken along line III-III' of FIG. 5. In describing the coil electronic component 300 of FIGS. 5 and 6, in order to avoid an overlapping description, configurations substantially overlapping those in the coil electronic component 100 according to the first exemplary embodiment will be denoted by the same reference numerals, and a detailed description thereof will be omitted.

The coil electronic component 300 according to the third exemplary embodiment may be different from the coil electronic component 100 according to the first exemplary embodiment in view of a structure of a first insulator.

Referring to FIGS. 5 and 6, when a first insulator 141 insulates between a plurality of coil patterns 131*a* to 131*d* and between the plurality of coil patterns and an encapsulant 11, the insulator 141 is not formed in a shape corresponding to surfaces of the plurality of coil patterns but may include a plurality of opening portions, and the plurality of coil patterns may be disposed in the opening portions. Particularly, a cross section of the first insulator 141 disposed inwardly of an innermost coil pattern 131*a* may include a triangular cross section insulating an inclined surface of the innermost coil pattern in addition to a rectangular cross section.

A method of forming the first insulator is not particularly limited. As an example, an insulating sheet may be laminated on a support member, and repeatedly subjected to exposure and/or development. For example, after performing primary exposure and subsequently performing secondary exposure, development may be performed. At the time of performing the primary exposure, an exposure may be performed at an exposure amount of, for example, 1000 $mJ/cm^2$ to 3000 $mJ/cm^2$, and the secondary exposure may only be additionally performed on a region in which the inclined surface are to be formed. In this case, it is suitable that an exposure amount of the secondary exposure is selected in a range of 2.5% to 15% of the exposure amount of the primary exposure, and may be preferably about 50 $mJ/cm^2$ to 400 $mJ/cm^2$.

When the coil patterns are insulated by the first insulator, an aspect ratio (a ratio of a thickness of each of the coil patterns to a width thereof) may be increased, and reliable insulation between the coil patterns may be achieved.

Meanwhile, a second insulator 142 may be additionally disposed in a region that is not insulated by the first insulator, for example, a region between an exposed upper surface of the coil pattern and the encapsulant. A method of forming the second insulator 142 is not particularly limited. That is, an insulating sheet or a resist film having insulating properties may be laminated or a sealing method using a resin having insulating properties may be used. Alternatively, a chemical vapor deposition method or sputtering method may also be adopted in consideration of properties of an insulating material.

Since a thickness of the second insulator 142 may be suitably selected, the second insulator 142 may be disposed up to a position lower than an upper surface of the first insulator 141 as illustrated in FIG. 6, but is not limited thereto. Although not specifically illustrated, the second insulator 142 may be disposed at a position higher than the upper surface of the first insulator 141, such that the second insulator 142 may be disposed to at least partially enclose the upper surface of the first insulator 141. In this case, since the second insulator 142 is additionally disposed, there is a limitation in a space to be filled with the encapsulant, but when insulation reliability is further required, insulating properties may be reinforced by double insulation of the first and second insulators 141 and 142.

Figure 7:
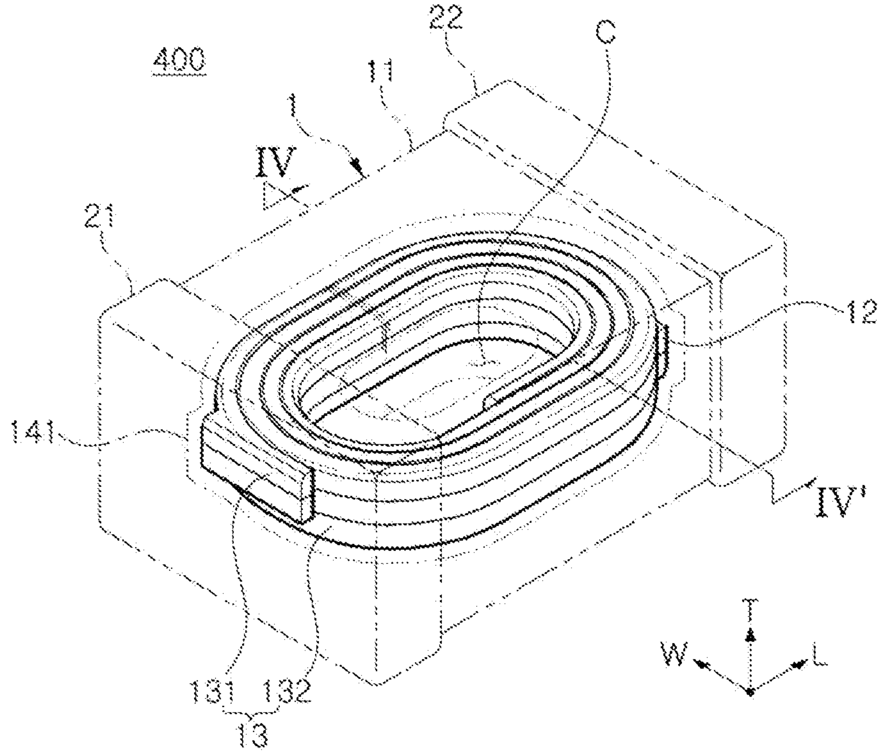
FIG. 7 is a schematic perspective view of a coil electronic component according to a fourth exemplary embodiment in the present disclosure.
Figure 8:
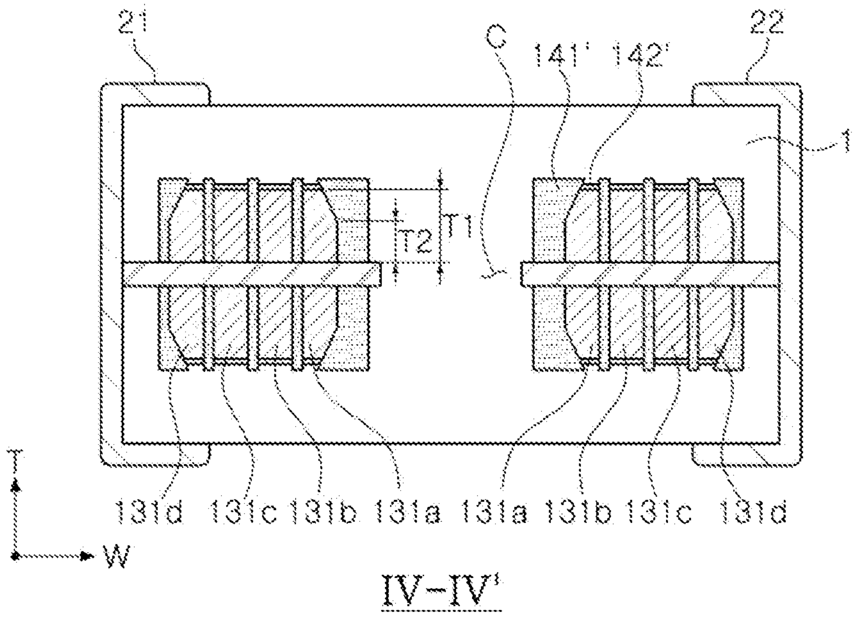
FIG. 8 is a schematic cross-sectional view taken along line IV-IV' of FIG. 7.

Next, FIG. 7 is a schematic perspective view of a coil electronic component 400 according to a fourth exemplary embodiment in the present disclosure, and FIG. 8 is a cross-sectional view taken along line IV-IV' of FIG. 7. In describing the coil electronic component 400 of FIGS. 7 and 8, in order to avoid an overlapping description, configurations substantially overlapping those in the coil electronic component 200 according to the second exemplary embodiment will also be denoted by the same reference numerals, and a detailed description thereof will also be omitted.

Referring to FIGS. 7 and 8, the coil electronic component 400 according to the fourth exemplary embodiment may be different from the coil electronic component 200 according to the second exemplary embodiment in view of a structure of a first insulator. A first insulator 141' of the coil electronic component 400 according to the fourth exemplary embodiment may be formed by substantially the same manufacturing process of the first insulator 141 of the coil electronic component 300 according to the third exemplary embodiment. That is, the first insulator 141' may have a structure in which coil patterns are filled in opening portions after the first insulator 141' is processed so as to include a plurality of opening portions.

However, in the coil electronic component 400 according to the fourth exemplary embodiment, the first insulator disposed outside an outermost coil pattern does not have a rectangular cross section but may have a triangular cross section in addition to the rectangular cross section so as to insulate an inclined surface of the outermost coil pattern.

Further, a second insulator 142' may be further disposed in a region that is not insulated by the first insulator, for example, a region between an exposed upper surface of the coil pattern and the encapsulant. Since in the coil electronic component according to the fourth exemplary embodiment, plating of the coil patterns is performed after the first insulator is formed, even after the coil patterns are formed, a portion that is not insulated by the first insulator may be formed. The second insulator 142' may be added in order to insulate this portion.

A method of forming the second insulator 142' is not particularly limited. That is, an insulating sheet or a resist film having insulating properties may be laminated or a sealing method using a resin having insulating properties may be used. Alternatively, a chemical vapor deposition method or sputtering method may also be adopted in consideration of properties of an insulating material.

Since a thickness of the second insulator 142' may be suitably selected, the second insulator 142' may be disposed up to a position lower than an upper surface of the first insulator 141' as illustrated in FIG. 8, but is not limited thereto. Although not specifically illustrated, the second insulator 142' may be disposed at a position higher than the upper surface of the first insulator 141', such that the second insulator 142' may be disposed to at least partially enclose the upper surface of the first insulator 141'. In this case, since the second insulator 142' is additionally disposed, there is a limitation in a space to be filled with the encapsulant, but when insulation reliability is further required, insulating properties may be reinforced by double insulation of the first and second insulators 141' and 142'.

The coil electronic component 400 according to the fourth exemplary embodiment is different from the coil electronic component 300 according to the third exemplary embodiment in view of a cross sectional shape of the outermost coil pattern and a structure of the first insulator insulating the outermost coil pattern. In the coil electronic component 400 according to the fourth exemplary embodiment, a flow of a magnetic flux generated from an internal coil may be optimized in the vicinity of the outermost coil pattern as well as an innermost coil pattern. As a result, characteristic values such as inductance, DC-bias, and the like, may be improved.

With the coil electronic component described above, a magnetic central core region in which a magnetic flux density is significantly increased may be significantly decreased, such that magnetic resistance may be decreased, and the magnetic flux density may be decreased, such that inductance may be increased and DC-bias characteristics may be improved.

Except for the description described above, a description of features overlapping those of the above-mentioned coil electronic component according to the exemplary embodiment in the present disclosure will be omitted.

As set forth above, according to exemplary embodiments in the present disclosure, the flow of the magnetic flux may be optimized through the entire region of the coil electronic component, and inductance and DC-bias characteristics may be improved.

While exemplary embodiments have been shown and described above, it will be apparent to those skilled in the art that modifications and variations could be made without departing from the scope of the present invention as defined by the appended claims.

What is claimed is:

1. A coil electronic component comprising:

a body including a support member having a through-hole, an internal coil comprising coil patterns disposed on one or more of upper and lower surfaces of the support member, and an encapsulant encapsulating the support member and the internal coil;

a first insulator disposed on a surface of each of the coil patterns; and external electrodes disposed on an external surface of the body and connected to the internal coil, wherein the coil patterns are wound in one direction and connected to each other, and among the coil patterns, an innermost coil pattern has a cross section composed of lower and upper cross sections, the lower cross section being rectangular, and the upper cross section at least partially including an inclined surface, wherein a portion of the first insulator disposed between the innermost coil pattern and the through-hole comprises a protrusion extending over a portion of a surface of the innermost coil pattern opposite the support member, and wherein the protrusion has a cross-section having a varying thickness.

2. The coil electronic component of claim 1, wherein the upper and lower cross sections are continuously formed without a boundary line.

3. The coil electronic component of claim 1, wherein one edge of the upper cross section in a highest position is parallel to the support member.

4. The coil electronic component of claim 1, wherein a minimum thickness of the innermost coil pattern is thinner than that of a coil pattern closest to the innermost coil pattern.

5. The coil electronic component of claim 1, wherein the first insulator further comprises a portion at least partially disposed between the internal coil and the encapsulant.

6. The coil electronic component of claim 5, wherein the first insulator includes a main body including a plurality of opening portions, and the coil patterns are disposed in the opening portions.

7. The coil electronic component of claim 6, wherein a cross section of a portion of the first insulator enclosing an inner side surface of the innermost coil pattern is a combination of a rectangle and a triangle including the inclined surface of the innermost coil pattern as one edge.

8. The coil electronic component of claim 6, wherein a second insulator is further disposed on surfaces of the coil patterns that do not come in contact with the first insulator.

9. The coil electronic component of claim 1, wherein an upper surface of an outermost coil pattern among the coil patterns is entirely parallel to the support member.

10. The coil electronic component of claim 1, wherein at least a portion of an upper surface of an outermost coil pattern among the coil patterns is an inclined surface.

11. The coil electronic component of claim 10, wherein an inclined direction of the inclined surface of the upper surface of the outermost coil pattern is opposite to an inclined direction of an inclined surface of an upper surface of the innermost coil pattern.

12. The coil electronic component of claim 1, wherein among the coil patterns, cross section shapes of the rest coil patterns except for innermost and outermost coil patterns are rectangles.

13. The coil electronic component of claim 1, wherein the encapsulant is filled in the through-hole.

14. The coil electronic component of claim 1, wherein the internal coil includes an upper coil disposed on the upper surface of the support member and a lower coil disposed on the lower surface of the support member, the upper and lower coils being connected to each other by a via.

15. A coil electronic component comprising:

a support member;

a spiral internal coil comprising coil patterns disposed on the support member;

a first insulator disposed on a surface of each of the coil patterns;

a second insulator disposed on surfaces of the coil patterns that do not come in contact with the first insulator including a surface of the coil pattern opposite the support member;

a body encapsulating the support member and the spiral internal coil; and external electrodes disposed on external surfaces of the body and connecting the spiral internal coil, wherein the coil patterns include an innermost coil pattern having a smallest diameter and an outermost coil pattern having a longest diameter, a cross section of the coil patterns is defined by a thickness and a width, a portion of the innermost coil pattern adjacent the support member has a width larger than a portion of the innermost coil pattern farther from the support member such that the portion of the innermost coil pattern with the larger width has a smaller thickness than that of the innermost coil pattern, and wherein the first insulator disposed between the outermost coil pattern and an external surface of the body perpendicular to the support member comprises a protrusion extending over a portion of the second insulator disposed on the surface of the outermost coil pattern opposite the support member.

16. The coil electronic component of claim 15, wherein a portion of the outermost coil pattern adjacent the support member has a width larger than a portion of the outermost coil pattern farther from the support member such that the portion of the outermost coil pattern with the larger width has a smaller thickness than a remainder of the outermost coil pattern.

17. The coil electronic component of claim 16, wherein the portion of the outermost coil pattern with the larger width is disposed farther from a center of the spiral internal coil than the remainder of the outermost coil pattern.

18. The coil electronic component of claim 15, wherein the portion of the innermost coil pattern with the larger width is disposed closer to a center of the spiral internal coil than the remainder of the innermost coil pattern.

* * * * *